(12) United States Patent
Dufour

(10) Patent No.: US 9,074,067 B2
(45) Date of Patent: Jul. 7, 2015

(54) CALCIUM CARBONATE SLURRIES

(71) Applicants: Rohm and Haas Company, Philadelphia, PA (US); Dow Global Technologies LLC, Midland, MI (US)

(72) Inventor: Alain Dufour, Valbonne (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/367,903

(22) PCT Filed: Dec. 10, 2012

(86) PCT No.: PCT/US2012/068695
§ 371 (c)(1),
(2) Date: Jun. 21, 2014

(87) PCT Pub. No.: WO2013/095961
PCT Pub. Date: Jun. 27, 2013

(65) Prior Publication Data
US 2014/0345496 A1    Nov. 27, 2014

(30) Foreign Application Priority Data
Dec. 22, 2011   (EP) .................................... 11290590

(51) Int. Cl.
*C09C 1/02* (2006.01)
*C08K 3/26* (2006.01)
*C08K 5/17* (2006.01)

(52) U.S. Cl.
CPC . *C08K 3/26* (2013.01); *C09C 1/021* (2013.01); *C01P 2004/61* (2013.01); *C01P 2006/22* (2013.01); *C08K 5/17* (2013.01); *C08K 2003/265* (2013.01)

(58) Field of Classification Search
CPC ............ C09C 1/021; C08K 5/17; C08K 3/26; C08K 2003/265; C01P 2004/61; C01P 2006/22
USPC .................................................. 106/464, 465
See application file for complete search history.

(56) References Cited

U.S. PATENT DOCUMENTS

| | | | |
|---|---|---|---|
| 4,845,191 A | 7/1989 | Hautier | |
| 5,879,442 A * | 3/1999 | Nishiguchi et al. | 106/464 |
| 6,946,510 B2 | 9/2005 | Suau et al. | |
| 7,115,692 B2 | 10/2006 | Mongoin et al. | |
| 7,615,587 B2 | 11/2009 | Qiu et al. | |
| 2002/0148582 A1 | 10/2002 | Drummond | |
| 2010/0181395 A1 | 7/2010 | Guerret | |
| 2011/0269887 A1 | 11/2011 | Gane | |
| 2012/0256140 A1 | 10/2012 | Buri et al. | |
| 2013/0207054 A1 | 8/2013 | Buri | |

FOREIGN PATENT DOCUMENTS

| | | | |
|---|---|---|---|
| EP | 1764346 A1 | 3/2007 | |
| JP | 2009-203086 A * | 9/2009 | ............. C01F 11/18 |
| WO | 2006081501 A1 | 8/2006 | |
| WO | WO2011/016003 A1 * | 2/2011 | ................ C09C 1/02 |

* cited by examiner

*Primary Examiner* — Anthony J Green
(74) *Attorney, Agent, or Firm* — Carl P. Hemenway

(57) ABSTRACT

A process is provided for making a calcium carbonate slurry comprising the steps of (a) forming a mixture comprising water, an acidic dispersant system, and calcium carbonate, (b) grinding said mixture to form a preliminary slurry of particles of said calcium carbonate, wherein 50% or more by weight of said calcium carbonate in said preliminary slurry, based on the total weight of said calcium carbonate in said preliminary slurry, is in the form of particles having diameter of 2 micrometers or less, and wherein the pH of said preliminary slurry is 9.0 or below, and (c) after step (b), adding one or more organic neutralizing agent to bring the pH of said preliminary slurry to 9.4 or above.

9 Claims, No Drawings

CALCIUM CARBONATE SLURRIES

It is often desired to provide an aqueous slurry of calcium carbonate particles. It is desirable that such a slurry have relatively high pH, to make the slurry compatible with other materials. For example, when it is desired to use the slurry in certain formulations involved in making or coating paper, the slurry should have pH of 9.4 or higher. It is further desired that such slurries have fine particles. It is further desirable that the slurry be free of macroscopic lumps. Another desirable characteristic is that the viscosity of the slurry be relatively low and that the viscosity of the slurry changes relatively little as a function of time during storage.

U.S. Pat. No. 7,615,587 describes the use of hydrosoluble homopolymers and/or copolymers of acrylic/or methacrylic acid with one or more acrylic vinyl or allyl monomers as an aid to the grinding of mineral particles in aqueous suspension.

Production of an aqueous slurry of calcium carbonate particles is often performed by obtaining a collection of calcium carbonate particles having relatively large particle size; forming a mixture of that collection of calcium carbonate particles, water, and dispersant. The mixture may then be ground until the particle size is desirably small.

It has been discovered that grinding the calcium carbonate particles with an alkaline dispersant generally results in a slurry in which the particle size is undesirably large. It has further been discovered that a slurry having smaller particle size can be achieved by using an acidic dispersant; however, the resulting slurries were discovered to have pH that undesirably was below 9.0. It has further been discovered that it is possible to take a slurry made with an acidic dispersant and to raise the pH by addition of an ordinary alkaline neutralizing agent; however, the result is a formulation with macroscopic lumps. The object of the present invention is to provide a method for making an aqueous slurry of calcium carbonate that has small particles, absence of macroscopic lumps, low viscosity, and storage-stable viscosity.

The following is a statement of the invention.

The first aspect of the present invention is a process for making a calcium carbonate slurry comprising the steps of (a) forming a mixture comprising water, an acidic dispersant system, and calcium carbonate, (b) grinding said mixture to form a preliminary slurry of particles of said calcium carbonate, wherein 50% or more by weight of said calcium carbonate in said preliminary slurry, based on the total weight of said calcium carbonate in said preliminary slurry, is in the form of particles having diameter of 2 micrometers or less, and wherein the pH of said preliminary slurry is 9.0 or below, and (c) after step (b), adding one or more organic neutralizing agent to bring the pH of said preliminary slurry to 9.4 or above.

The second aspect of the present invention is the aqueous slurry of calcium carbonate made by the method of the first aspect of the present invention.

The following is a detailed description of the invention.

As used herein, the following terms have the designated definitions, unless the context clearly indicates otherwise.

A slurry is a collection of solid particles distributed throughout a continuous liquid medium. A liquid medium is aqueous if it has 75% or more by weight of water, based on the weight of the continuous medium.

A dispersant is a compound that aids in the formation and/or stabilization of a slurry of inorganic particles in an aqueous medium. A dispersant system is either an single dispersant or a mixture of dispersants. A dispersant system is an acidic dispersant system if it meets the following test. A solution of the dispersant system is made in water at concentration of 40% by weight based on the total weight of the solution. The pH of that solution is known herein as the pH of the dispersant system. An acidic dispersant system has pH less than 7.0. A mixture of two or more dispersants is considered herein to be an acidic dispersant system if a 40% by weight solution in water of that mixture has pH less than 7.0, regardless of what the pH would be of a 40% by weight solution in water of one of the dispersants by itself.

Grinding is a process in which mechanical stresses are applied to solid particles to reduce their size.

The size of a solid particle is characterized by its diameter. If the particle is not spherical, its diameter is considered to be the diameter of a sphere having the same volume as the particle. A collection of solid particles may be characterized by the distribution of the diameters of those solid particles, for example by using one or more parameter DX, where X is a number from 0 to 100. DX is a length chosen so that X % of the total volume of the solid particles in the collection is in the form of particles having diameter less than DX. For example, if a collection of particles has D80=10 micrometers, then 80% of the volume of the collection of particles is in the form of particles having diameter less than 10 micrometers.

An organic compound is a compound that contains carbon, excluding compounds that are not normally considered to be organic compounds, such as binary compounds (for example carbon oxides, carbides, and carbon disulfide), ternary compounds (for example metallic cyanides, metallic carbonyls, phosgene, and carbonyl sulfide), carbonates, and bicarbonates.

A polymer is a relatively large molecule made up of the reaction products of smaller chemical repeat units. Polymer molecular weights can be measured by standard methods such as, for example, size exclusion chromatography (SEC, also called gel permeation chromatography or GPC). Polymers have weight-average molecular weight (Mw) of 1,000 or more. Polymers may be linear, branched, star-shaped, or a mixture thereof. Molecules that can react with each other to form the repeat units of a polymer are known herein as "monomers." The residue of a monomer that remains in a polymer is known herein as a "polymerized unit" of that monomer. An organic polymer is a polymer that is made of polymerized units of monomers that are organic compounds.

A compound is considered herein to be water soluble if the amount of that compound that will dissolve in 100 grams of water at 25° C. is 5 grams or more.

Processes and tests described herein are assumed to be conducted at room temperature (approximately 22° C.) unless stated otherwise.

The process of the present invention involves the use of an acidic dispersant system. Suitable dispersants for use in the dispersant system include, for example, alkali polyphosphates and anionic polymers. Preferred are anionic polymers. Anionic polymers are organic polymers that have pendant carboxyl groups or sulfonic acid groups. Preferred are carboxyl groups. Preferred anionic polymers have polymerized units of one or more of acrylic acid, methacrylic acid, or maleic anhydride (considered herein to be equivalent to maleic acid). The weight-average molecular weight of the anionic polymer is preferably 1,500 or higher; more preferably 2,500 or higher. The weight-average molecular weight of the anionic polymer is preferably 15,000 or lower; more preferably 6,000 or lower; more preferably 4,500 or lower. Anionic polymers may be fully neutralized or partially neutralized. Fully neutralized means herein that more than 95 mole percent of the pendant carboxyl groups and sulfonic acid groups that are present are in the anionic state. Partially neutralized means herein that 1 to 95 mole percent of the pendant carboxyl groups and sulfonic acid groups that are present are in the anionic state. Preferably, the acidic dispersant system contains one or more partially neutralized anionic polymer. More preferably, the acidic dispersant system contains a mixture of one or more partially neutralized anionic polymer with one or more fully neutralized anionic polymer.

Preferably the pH of the acidic dispersant system is 6.5 or less; more preferably 6.0 or less; more preferably 5.5 or less.

The process of the present invention involves grinding solid calcium carbonate. Solid calcium carbonate of any size may be used as the starting material. Preferably, the starting material for the grinding process is a collection of calcium carbonate particles having D50 of more than 2 micrometers; more preferably 4 micrometers or more. Preferably, grinding is performed on a collection of calcium carbonate particles having D50 of 20 micrometers or less; more preferably 15 micrometers or less; more preferably 10 micrometers or less.

Preferably, the process of the present invention includes forming an initial mixture of calcium carbonate starting material, water, and dispersant. The amount of calcium carbonate in the initial mixture is, by weight based on the weight of the initial mixture, preferably 60% or more; more preferably 70% or more. The amount of calcium carbonate in the initial mixture is, by weight based on the weight of the initial mixture, preferably 85% or less; more preferably 80% or less. Preferably, the amount of dispersant in said initial mixture is, by weight of solid dispersant based on the weight of solid calcium carbonate, 0.05% or more; more preferably 1% or more; more preferably 1.5% or more. Preferably, the amount of dispersant in said initial mixture is, by weight of solid dispersant based on the weight of solid calcium carbonate, 2% or less; more preferably 1% or less; more preferably 1% or less.

Preferably, the dispersant used in the formation of the initial mixture is not an acidic system. Preferably, the dispersant used in the formation of the initial mixture contains one or more anionic polymer that is fully neutralized.

The process of the present invention involves grinding. Grinding may be performed using any apparatus. Some suitable devices include, for example, rotor-stator dispersers, high-shear mills (which force mixtures through narrow gaps), media mills, multiple-roll mills, double-blade mixers, kneaders, and screw mixers.

The initial mixture is placed in a grinding apparatus and the grinding process is begun. Preferably, additional dispersant is added one or more time to the mixture during the grinding process. The additional dispersant may be identical or different from the dispersant that was present in the initial mixture. If dispersant is added more than one time during the grinding process, each addition of dispersant may be identical to or different from the dispersant that was added in every other addition of dispersant during the grinding process.

Preferably, after the grinding process has begun and before the grinding process is finished, some fully neutralized anionic polymer dispersant is added. Preferably, after the grinding process has begun and before the grinding process is finished, some partially neutralized anionic polymer dispersant is added. Preferably, after the grinding has begun, some fully neutralized anionic polymer dispersant is added, after which some partially neutralized anionic polymer dispersant is added.

It is useful to assess the pH of the dispersant system used. Preferably, the pH of the dispersant system is 6.5 or lower; more preferably 6.0 or lower; more preferably 6.0 or lower; more preferably 5.5 or lower. Preferably, the pH of the dispersant system is 3 or higher; more preferably 4 or higher.

Preferably, the amount of all dispersants in the slurry of the present invention is, by dry weight of dispersants based on the dry weight of calcium carbonate, 0.2% or more; more preferably 0.4% or more; more preferably 6% or more. Preferably, the amount of all dispersants in the slurry of the present invention is, by dry weight of dispersants based on the dry weight of calcium carbonate, is 2% or less; more preferably 1% or less.

Grinding sometimes causes the mixture being ground to become hot. Preferably, grinding is begun at room temperature, and cooling techniques are used if the temperature reaches 95° C. or higher. Preferably, the temperature is maintained at 95° C. or below throughout the grinding process.

When the grinding process is complete, all the dispersants that were added to the initial mixture and to the mixture during grinding are considered. If the same dispersants in the same amounts were mixed with each other, the result would be an acidic dispersant system. For example, in some embodiments, a solution in water of a first dispersant is obtained with concentration that may be different from 40% by weight, and a solution in water of a second dispersant is obtained with concentration that may be different from 40% by weight; and the solution of the first dispersant is added to the slurry followed by the solution of the second dispersant. In such embodiments, the ratio of solid weight of the first dispersant to the solid weight of the second dispersant is called D1:D2. In such embodiments, it is useful to characterize the nature of the combination of dispersants by making a standard solution in water that has 40% total dispersant by weight and that has first dispersant and second dispersant present with solid weight ratio of D1:D2. That standard solution will have pH of less than 7.0

When the grinding process is complete, the resulting material is referred to herein as the preliminary slurry. Preferably, D75 of the calcium carbonate particles in the preliminary slurry is 2 micrometers or less; more preferably D85 of the calcium carbonate particles in the preliminary slurry is 2 micrometers or less. Preferably, the pH of the preliminary slurry is 9.0 or lower. Preferably, the pH of the preliminary slurry is 6.5 or higher; more preferably 7.5 or higher.

After the grinding process is complete, it is preferred to assess the preliminary slurry to determine if any water was lost during the grinding process and to replace any water that was lost during the drying process.

The final slurry is then formed by adding one or more organic neutralizing agent to the preliminary slurry. A neutralizing agent is a compound that, when added to the preliminary slurry, raises the pH of the preliminary slurry.

Preferred neutralizing agents have pKa of the conjugate acid of 7.5 or higher; more preferred is 8.0 or higher; more preferred is 8.5 or higher; more preferred is 9.0 or higher. Preferred neutralizing agents have pKa of the conjugate acid of 13 or lower.

Preferred neutralizing agents are soluble in water. More preferably, the amount of neutralizing agent that will dissolve in water at 25° C. is 10 grams or more; more preferably 25 grams or more; more preferably 50 grams or more.

Preferred neutralizing agents have boiling point at one atmosphere pressure of 100° C. or higher; more preferably 125° C. or higher; more preferably 150° C. or higher. Preferred neutralizing agents have boiling point at one atmosphere pressure of 400° C. or lower.

Preferred organic neutralizing agents are primary, secondary, or amine compounds. Preferred organic amine compounds are 2-amino-2-methyl-1-propanol, 2-amino-1-butanol, 2-amino-1-methyl-1,3-propane diol, 2-amino-2-methyl-1,3-propane diol, 2-dimethylamino-2-methyl-1-propanol, tris(hydroxymethyl)aminomethane, dimethylamino ethanol, diethylamino ethanol, morpholine, triethanolamine, triethylamine, monoethanolamine, cyclohexylamine, and mixtures thereof. More preferred are 2-amino-2-methyl-1-propanol, morpholine, triethanolamine, monoethanolamine, cyclohexylamine, and mixtures thereof. More preferred is 2-amino-2-methyl-1-propanol.

Preferably, no inorganic neutralizing agent is used, or if any inorganic neutralizing agent is used, the ratio of the weight of inorganic neutralizing agent to organic neutralizing agent is from 0:1 to 0.01:1. Inorganic neutralizing agents include, for example, neutralizing agents chosen from ammonia, metal hydroxides, metal carbonates, and metal bicarbonates.

After addition of organic neutralizing agent to the preliminary slurry, the pH is 9.0 or higher; more preferably 9.4 or higher; preferably 9.5 or higher.

Preferably, there is only a small amount of "other" material in the final slurry (i.e., other than water, calcium carbonate, dispersants, and organic neutralizing agent). Preferably, the amount of such "other" material is, by weight based on the weight of the final slurry, 10% or less; more preferably 5% or less; more preferably 2% or less; more preferably 1% or less.

Preferably, the final slurry has the same distribution of particle size of calcium carbonate as the preliminary slurry. Preferably, the final slurry has no lumps of material that are visible to the unaided eye.

The viscosity of the final slurry may be measured. A preferred measurement method is made at room temperature with a Brookfield viscometer, model RV, with spindle number 4; the speed is chosen to give a torque reading of between 10% and 90% of the full scale of the torque meter. Viscosity is reported in milliPascal·seconds (mPa·s). Preferably, for a slurry having concentration 75% $CaCO_3$ by weight based on the weight of the slurry, the viscosity is 150 mPa·s or higher. Preferably, for a slurry having concentration 75% $CaCO_3$ by weight based on the weight of the slurry, the viscosity is 800 mPa·s or lower; more preferably 600 mPa·s or lower; more preferably 500 mPa·s or lower; more preferably 450 mPa·s or lower.

The following are examples of the present invention.

In the following examples, the following abbreviations are used:

| | |
|---|---|
| Dow | The Dow Chemical Company |
| Disp. A | Acumer ™ 9420, polycarboxylate sodium salt, dispersant from Dow |
| Disp. B | Acumer ™ 9460, polycarboxylate partial sodium salt, dispersant from Dow |
| Disp. C | Acumer ™ 9410, polycarboxylate partial sodium salt, dispersant from Dow |
| Disp D | polycarboxylate, partially neutralized, dispersant from Dow |
| Disp E | polycarboxylate, fully neutralized, dispersant from Dow |
| F.N. Disp | fully neutralized dispersant |
| P.N. Dis | partially neutralized dispersant |
| AMP | 2-amino-2-methyl-1-propanol (AMP-95 ™ additive from Angus Chemical) |
| TEA | triethanolamine |
| MEA | monoethanolamine |
| MOR | Morpholine |
| CHA | cyclohexylamine |
| ZAC | zircon/aluminum/corindum alloy balls, diameter 1.1 to 1.6 mm |
| Neut. Ag. | neutralizing agent |
| Visc. | viscosity |
| nm | not measured |
| amt | amount |

EXAMPLE 1

Preparation of Initial Slurry

The following were mixed to form the initial slurry: coarse calcium carbonate powder (480 grams), fully neutralized dispersant (0.20% by weight of dry dispersant, based on the weight of dry calcium carbonate), and water to obtain an initial slurry in which the weight of solid calcium carbonate was 74% based on the total weight of the initial slurry.

EXAMPLE 2

Grinding

ZAC balls (1176 grams) were placed into a stainless steel double walled beaker rotating at about 300 rpm. The slurry of Example 1 (588 grams) was added to the beaker. Rotation was increased to 3500 rpm, and the remaining fully neutralized dispersant was added (see below for the amount used). The partially neutralized dispersant was added in six equal portions, at 10 minutes, 20 minutes, 30 minutes, 40 minutes, 50 minutes, and 60 minutes. When the temperature of the slurry reached 85° C., cooling was applied to maintain the temperature at 85° C. Grinding was continued until D90 was less than 2 micrometer. The slurry was removed from the beaker, placed in a smaller beaker, and stirred for 10 min at 1200 rpm. 1 gram was removed and measured to determine the weight percent of calcium carbonate. Sufficient water was added to the slurry to bring the weight percent of calcium carbonate, based on the total weight of the slurry, to 75%. The pH of the slurry was measured.

When a neutralizing agent was used, it was added with stirring to the slurry until pH reached 9.7 to 9.9.

Particle size was measured using Coulter™ LS 232 laser scattering device from Coulter Company.

Viscosity was measured as described above, reported here as the viscosity at 0 hours. The slurry was stored at room temperature, and viscosity was measured again at 1, 24, and 168 hours.

EXAMPLE 3

Sample Set I

The following Slurries were prepared as in Example 1 and Example 2. Samples with a number containing "C" were comparative samples. Grinding time was 77 to 78 minutes. All final slurries had D90 of less than 2 micrometers. After grinding, neutralizing agent (if any) was added with stirring to reach the final pH shown below. Slurries were visually examined to determine whether lumps were visible. Slurries were as follows:

| No. | F.N. Disp. type | F.N. Disp amount[1] | P.N. Disp. type | P.N. Disp. amount[1] | pH[2] | Neut. Ag. type | Neut. Ag. amount[3] | final pH | Visible lumps? |
|---|---|---|---|---|---|---|---|---|---|
| 1C | D | 0.226 | D | 0.540 | 9.6 | none | 0 | 9.6 | none |
| 2C | D | 0.226 | E | 0.540 | 8.9 | none | 0 | 8.9 | none |
| 3C | D | 0.226 | E | 0.540 | 8.9 | NaOH[4] | 0.03 | 9.9 | many |
| 4 | D | 0.226 | E | 0.540 | 8.9 | AMP | 0.05 | 9.7 | none |
| 5 | D | 0.226 | E | 0.500 | 8.9 | AMP | 0.03 | 9.7 | none |

[1] weight % of dry dispersant based on the weight of dry calcium carbonate
[2] after grinding and before addition of neutralizing agent
[3] weight % of neutralizing agent as is based on the weight of dry calcium carbonate
[4] added as a solution of 50% by weight NaOH in water, based on the weight of the solution The viscosity results for these slurries were as follows:

| No. | Visc. 0 hr. | Visc. 1 hr | Visc. 24 hr | Visc. 168 hr |
|---|---|---|---|---|
| 1C | 408 | 1338 | >2000 | nm |
| 2C | 326 | 526 | 1138 | 1856 |
| 3C | 278 | 322 | 498 | 884 |
| 4 | 288 | 332 | 448 | 744 |
| 5 | 270 | 354 | 630 | 1050 |

Without neutralizing agent, the viscosity became unacceptably high within 24 hours. When NaOH was used as neutralizing agent, many lumps were formed. When AMP was used as neutralizing agent, viscosity at 24 hours remained acceptable and no lumps were formed.

EXAMPLE 4

Sample Set II

Slurries were made and tested as in Example 3. Slurries and results were as follows:

| No. | F.N. Disp. type | F.N. Disp amount[1] | P.N. Disp. type | P.N. Disp. amount[1] | pH[2] | Neut. Ag. type | Neut. Ag. amount[3] | final pH | Visible lumps? |
|---|---|---|---|---|---|---|---|---|---|
| 6C | D | 0.226 | E | 0.540 | 8.8 | none | 0 | 8.8 | none |
| 7C | D | 0.226 | E | 0.540 | 8.8 | NaOH[4] | 0.05 | 9.7 | many |
| 8C | D | 0.226 | E | 0.540 | 8.8 | KOH[5] | 0.09 | 9.8 | many |
| 9C | D | 0.226 | E | 0.540 | 8.8 | NH$_4$OH[6] | 0.03 | 9.7 | none |
| 10 | D | 0.226 | E | 0.540 | 8.8 | AMP | 0.05 | 9.7 | none |
| 11 | D | 0.226 | E | 0.540 | 8.8 | TEA[7] | 0.71 | 9.7 | none |
| 12 | D | 0.226 | E | 0.540 | 8.8 | MEA | 0.05 | 9.8 | none |
| 13 | D | 0.226 | E | 0.540 | 8.8 | MOR | 0.22 | 9.7 | none |
| 14 | D | 0.226 | E | 0.540 | 8.8 | CHA | 0.04 | 9.7 | none |

[1] weight % of dry dispersant based on the weight of dry calcium carbonate
[2] after grinding and before addition of neutralizing agent
[3] weight % of neutralizing agent as is based on the weight of dry calcium carbonate
[4] added as a solution of 50% by weight NaOH in water, based on the weight of the solution
[5] added as a solution of 34 weight % KOH in water, based on the weight of the solution
[6] added as a solution of 29 weight % NH$_4$OH in water, based on the weight of the solution
[7] added as 85% pure TEA The viscosity results for these slurries were as follows:

| No. | Visc. 0 hr. | Visc. 1 hr | Visc. 24 hr | Visc. 168 hr |
|---|---|---|---|---|
| 6C | 232 | 352 | 624 | 1102 |
| 7C | 232 | 274 | 380 | 612 |
| 8C | 248 | 290 | 426 | 736 |
| 9C | 336 | 406 | 550 | 820 |
| 10 | 242 | 258 | 296 | 396 |
| 11 | 202 | 224 | 286 | 380 |
| 12 | 232 | 252 | 324 | 448 |
| 13 | 226 | 246 | 302 | 438 |
| 14 | 224 | 242 | 288 | 422 |

Without neutralizing agent, the viscosity became unacceptably high within 24 hours. When NaOH or KOH was used as neutralizing agent, many lumps were formed. When AMP was used as neutralizing agent, viscosity at 24 hours remained acceptable and no lumps were formed. When NaOH, KOH, or ammonia was used as neutralizing agent, the viscosity at 24 hours was undesirably higher than when AMP, TEA, MEA, MOR, or CHA was used as neutralizing agent.

EXAMPLE 5

Sample Set III

The following slurries were prepared. The "first dispersant" and "second dispersant" were used in place of the "fully neutralized dispersant" and the "partially neutralized dispersant" in the procedure described above. Disp. A is fully neutralized; Disp. B and Disp. C are partially neutralized. The sum of the weights of the first dispersant and the second dispersant was 1.0% based on the weight of dry calcium carbonate. Grinding time was 77 to 78 minutes. All final slurries had D90 of less than 2 micrometers. After grinding, neutralizing agent (if any) was added with stirring to reach the final pH shown below. After grinding, water was added to adjust the concentration of calcium carbonate to 78% by weight of dry calcium carbonate based on the weight of the slurry (unlike the concentration of 75% in the slurries described above).

| No. | first Disp. type | first Disp amt[1] | second Disp. type | second Disp. amt[1] | disp. pH[4] | pH[2] | Neut. Ag. type | Neut. Ag. amt[3] | final pH |
|---|---|---|---|---|---|---|---|---|---|
| 15C | Disp. A | 0.63 | Disp. B | 0.37 | 6.1 | 9.3 | none | 0 | 9.3 |
| 16 | Disp. A | 0.63 | Disp. B | 0.37 | 6.1 | 9.3 | AMP | 0.03 | 9.6 |
| 17C | Disp. A | 0.63 | Disp. C | 0.37 | 5.6 | 8.7 | none | 0 | 8.7 |
| 18 | Disp. A | 0.63 | Disp. C | 0.37 | 5.6 | 8.7 | AMP | 0.06 | 9.5 |
| 19C | Disp. B | 0.63 | Disp. C | 0.37 | 5.1 | 8.7 | none | 0 | 8.7 |
| 20 | Disp. B | 0.63 | Disp. C | 0.37 | 5.1 | 8.7 | AMP | 0.08 | 9.5 |
| 21C | Disp. A | 0.20 | Disp. C | 0.80 | 4.8 | 8.6 | none | 0 | 8.6 |
| 22 | Disp. A | 0.20 | Disp. C | 0.80 | 4.8 | 8.6 | AMP | 0.07 | 9.5 |

[1]weight % of dry dispersant based on the weight of dry calcium carbonate
[2]after grinding and before addition of neutralizing agent
[3]weight % of neutralizing agent as is based on the weight of dry calcium carbonate
[4]pH of the dispersant system, as defined above The viscosity test results were as follows:

| No. | Visc. 0 hr. | Visc. 1 hr | Visc. 24 hr |
|---|---|---|---|
| 15C | 730 | 1892 | 5480 |
| 16 | 732 | 1756 | 5500 |
| 17C | 570 | 1136 | 3340 |
| 18 | 528 | 964 | 3080 |
| 19C | 448 | 702 | 1752 |
| 20 | 444 | 602 | 1292 |
| 21C | 498 | 668 | 1382 |
| 22 | 514 | 588 | 926 |

The lower the pH the dispersant system, the lower the viscosity of the slurry at 0 hours. Also, the lower the viscosity of the slurry at 0 hours, the greater the effect of using AMP.

The invention claimed is:

1. A process for making a calcium carbonate slurry comprising the steps of
    (a) forming a mixture comprising water, an acidic dispersant system, and a collection of calcium carbonate particles having D50 more than 2 micrometers, wherein said acidic dispersion system is selected from the group consisting of one or more anionic polymer partially neutralized with sodium, one or more anionic polymer fully neutralized with sodium, and mixtures thereof,
    (b) grinding said mixture to form a preliminary slurry of particles of said calcium carbonate, wherein 50% or more by weight of said calcium carbonate in said preliminary slurry, based on the total weight of said calcium carbonate in said preliminary slurry, is in the form of particles having diameter of 2 micrometers or less, and wherein the pH of said preliminary slurry is 9.0 or below, and
    (c) after step (b), adding one or more organic neutralizing agent to bring the pH of said preliminary slurry to 9.4 or above.

2. The process of claim 1, wherein said acidic dispersant system has pH of 6.5 or less.

3. The process of claim 1, wherein said organic neutralizing agent is an organic amine compound.

4. The process of claim 1, wherein said organic neutralizing agent has boiling point at one atmosphere pressure of 100° C. or higher.

5. The process of claim 1, wherein said calcium carbonate is present in said mixture in an amount of 60% or more by weight, based on the weight of the mixture.

6. The process of claim 1, wherein every acidic dispersant present said mixture is selected from the group consisting of one or more anionic polymer partially neutralized with sodium, one or more anionic polymer fully neutralized with sodium, and mixtures thereof.

7. A process for making a calcium carbonate slurry comprising the steps of
    (a) forming a mixture comprising water, an acidic dispersant system, and calcium carbonate, wherein said calcium carbonate is in a form of particles having D50 of 20 micrometers or less,
    (b) grinding said mixture to form a preliminary slurry of particles of said calcium carbonate, wherein 50% or more by weight of said calcium carbonate in said preliminary slurry, based on the total weight of said calcium carbonate in said preliminary slurry, is in the form of particles having diameter of 2 micrometers or less, and wherein the pH of said preliminary slurry is 9.0 or below, and
    (c) after step (b), adding one or more organic neutralizing agent to bring the pH of said preliminary slurry to 9.4 or above.

8. The process of claim 7, wherein said calcium carbonate is present in said mixture in an amount of 60% or more by weight, based on the weight of the mixture.

9. The process of claim 7, wherein said acidic dispersion system is selected from the group consisting of one or more anionic polymer partially neutralized with sodium, one or more anionic polymer fully neutralized with sodium, and mixtures thereof.

* * * * *